(12) United States Patent
Kiku

(10) Patent No.: US 6,908,069 B2
(45) Date of Patent: Jun. 21, 2005

(54) FLUID VALVE APPARATUS

(75) Inventor: Nobutaka Kiku, Okazaki (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 85 days.

(21) Appl. No.: 10/666,239

(22) Filed: Sep. 22, 2003

(65) Prior Publication Data
US 2005/0001187 A1 Jan. 6, 2005

(30) Foreign Application Priority Data

Sep. 19, 2002 (JP) .......................... 2002-273211

(51) Int. Cl.[7] .............................. F16K 31/02
(52) U.S. Cl. .................. 251/129.11; 251/344
(58) Field of Search .................. 251/343, 344, 251/345, 325, 129.11

(56) References Cited

U.S. PATENT DOCUMENTS 5,529,281 A * 6/1996 Brudnicki et al. ..... 251/129.21
6,116,571 A * 9/2000 Hettinger ............... 251/129.2
6,361,018 B2 * 3/2002 Roth et al. .............. 251/344
6,733,000 B2 * 5/2004 McCarty et al. ......... 251/344

FOREIGN PATENT DOCUMENTS

JP    11-218245    8/1999

* cited by examiner

Primary Examiner—John Bastianelli
(74) Attorney, Agent, or Firm—Oblon, Spivak, McClelland, Maier & Neustadt, P.C.

(57) ABSTRACT

A fluid valve includes a base body having a fluid intake, a fluid outlet and a valve accommodation chamber formed between the fluid intake and fluid outlet, a cylindrical valve accommodated movably in the valve accommodation chamber, and a driving portion for moving the cylindrical valve in a direction for adjusting the opening degree of the cylindrical valve. The cylindrical valve is moved by the driving portion so as to change flow path areas of the first valve second valve flow paths thereby changing the flow rate flowing through the inner peripheral flow path.

9 Claims, 9 Drawing Sheets

FLUID VALVE APPARATUS

CROSS REFERENCE TO RELATED APPLICATIONS

The present application is based on and claims priority under 35 U.S.C § 119 with respect to Japanese Patent Application No. 2002-273211 filed on Sep. 19, 2002 the entire content of which is incorporated herein by reference.

BACKGROUND OF THE INVENTION

1. Field of the Invention

The present invention relates to a fluid valve apparatus in which fluid such as air flows.

2. Description of the Related Art

Japanese Patent Laid-Open Publication No.11-218245 has disclosed a pressure adjusting valve apparatus comprising a base body comprised of an intake through which pressurized fluid flows, an outlet through which the fluid flows out and a valve accommodation chamber, a cylindrical valve accommodated in the valve accommodation chamber of the base body such that the valve is movable, and a driving portion for moving the cylindrical valve in an axial direction.

According to this publication, if the driving portion is driven so that the cylindrical valve is moved in the axial direction, a sectional area of a valve path becomes variable thereby making the quantity of fluid flowing through the valve path variable and consequently, fluid pressure in devices connected to the pressure adjusting valve apparatus is adjusted.

In this pressure adjusting valve apparatus, although a path in which fluid flows is formed on the side of an outer periphery of the cylindrical valve, the quantity of fluid flowing through the pressure adjusting valve apparatus is not sufficient. For the reason, when an apparatus connected to the pressure adjusting valve apparatus requests a control on a large amount of fluid flow, usage of this pressure adjusting valve apparatus can be restricted.

SUMMARY OF THE INVENTION

The present invention has been achieved in views of the above-described problems and an object of the present invention is to provide a fluid valve apparatus advantageous for increasing the quantity of fluid which can be controlled.

To achieve the above object, the present invention provides a fluid valve apparatus comprising: a base body having a fluid intake through which fluid flows in, a fluid outlet through which fluid is discharged, and a valve accommodation chamber formed between the fluid intake and the fluid outlet; a cylindrical valve accommodated movably in the valve accommodation chamber in the base body; and a driving portion for moving the cylindrical valve in a direction of adjusting the opening degree of the cylindrical valve, the cylindrical valve including: an outer peripheral wall face which forms an outer peripheral flow path in the cylindrical valve so that fluid flows from the fluid intake to the fluid outlet; an inner peripheral wall face which forms an inner peripheral flow path so that fluid flows from the fluid intake to the fluid outlet; a first valve section which forms a first valve flow path with a first valve receiving section of the base body so that fluid flows through one of the outer peripheral flow path and the inner peripheral flow path; and a second valve section which forms a second valve flow path with a second valve receiving section of the base body so that fluid flows through the other of the outer peripheral flow path and the inner peripheral flow path, wherein the cylindrical valve is moved by the driving portion so as to change flow path areas of said first valve flow path and said second valve flow path thereby changing the quantity of fluid flowing through the outer peripheral flow path and fluid flowing through the inner peripheral flow path of the cylindrical valve.

In the fluid valve apparatus of the present invention, as described above, the outer peripheral flow path is formed by an outer peripheral wall face of the cylindrical valve while the inner peripheral flow path is formed by the inner peripheral wall face of the cylindrical valve. Because fluid flows through both the outer peripheral flow path and the inner peripheral flow path, the quantity of fluid flowing through the fluid valve apparatus increases. Thus, the present invention is suitable for a fluid valve apparatus connected to an apparatus which requests a control on a large amount of fluid flow.

DESCRIPTION OF THE PREFERRED EMBODIMENTS

Figure 1:
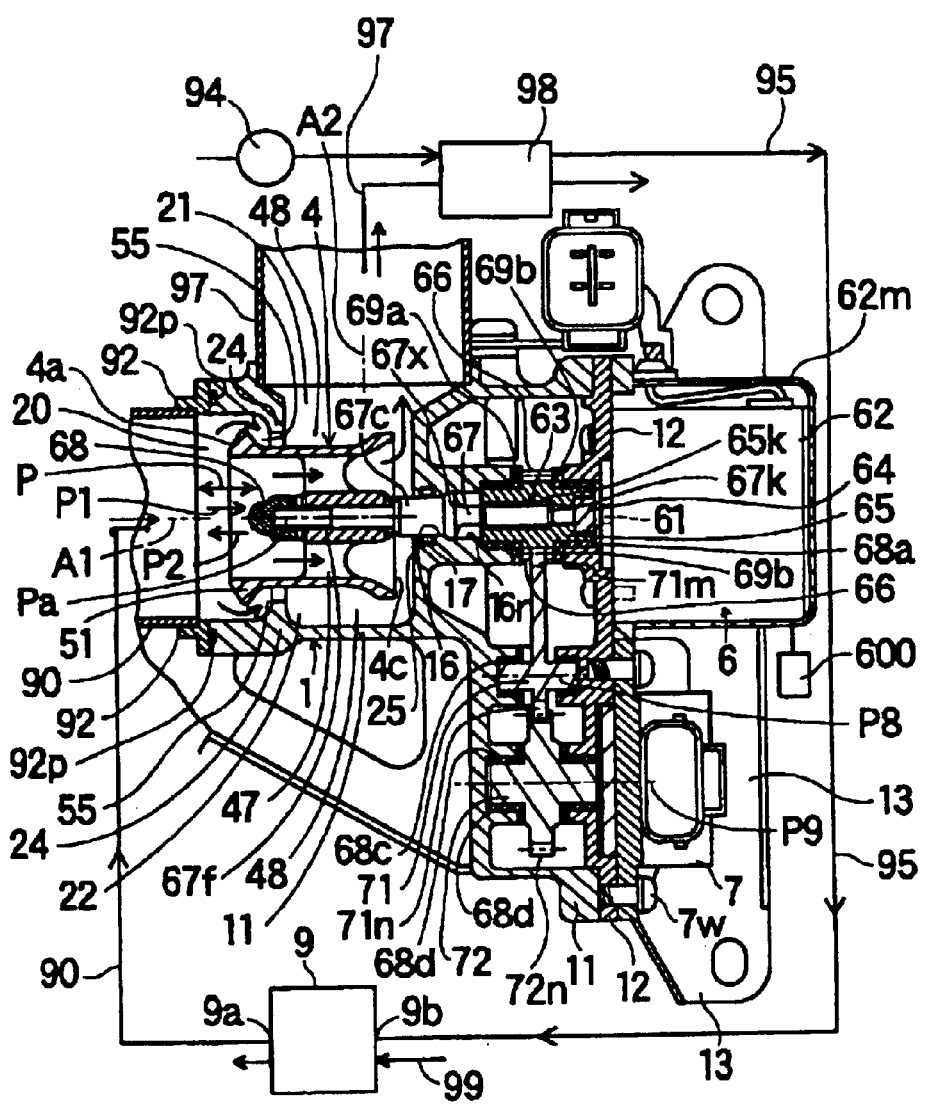
FIG. 1 is an entire sectional view along a horizontal direction of a fluid valve apparatus in a state in which its cylindrical valve is opened.

The present invention can adopt at least one of following embodiments.

The base body includes a fluid intake through which fluid flows in, a fluid outlet through which fluid is discharged and a valve accommodation chamber formed between the fluid intake and the fluid outlet. Fluid may be gas or liquid. The cylindrical valve is accommodated movably in a valve accommodation chamber in the base body. The driving portion moves the cylindrical valve in a direction of adjusting the opening degree of the cylindrical valve. As the driving portion, it is permissible to employ a motor unit which provides a rotation motion or a fluid pressure cylinder unit which executes a linear motion. The material of the cylindrical valve is not restricted to any particular one, but may be metal, resin or ceramic.

The cylindrical valve may adopt a style in which its shaft end section in the axial direction is disposed in the valve accommodation chamber of the base body such that it confronts fluid flowing from the fluid intake to the fluid outlet. In this case, the pressure receiving area of the cylindrical valve on which fluid acts is decreased. Thus, when the cylindrical valve is moved relative to fluid flow by the driving portion, a load acting on the driving portion is reduced so as to decrease the output of the driving portion, thereby making it possible to reduce the size and power consumption of the driving portion. If the urging force due to the fluid pressure acts upon one of the shaft end section of the cylindrical valve while an urging force in an opposite direction due to the fluid pressure acts on the other shaft end section, all of both the urging forces or most percentage of the urging forces is cancelled out by each other. In this case, when the cylindrical valve is moved relative to the fluid flow by the driving portion, the load acting on the driving portion is reduced and the output of the driving portion can be reduced, thereby making it possible to reduce the size and power consumption of the driving portion. In the meantime, if the inside diameter of the cylindrical valve is expressed as 100 for its relative notation, the axial size of the cylindrical valve can be less than 300, less than 200 and less than 150 and 30 or more styles can be exemplified. However, the present invention is not restricted to these examples.

The cylindrical valve can adopt a style including: an outer peripheral wall face which forms an outer peripheral flow path in the cylindrical valve so that fluid flows from the fluid intake to the fluid outlet; an inner peripheral wall face which forms an inner peripheral flow path so that fluid flows from the fluid intake to the fluid outlet; a first valve section which forms a first valve flow path with a first valve receiving section of the base body so that fluid flows through either of the outer peripheral flow path and the inner peripheral flow path; and a second valve section which forms a second valve flow path with a second valve receiving section of the base body so that fluid flows through the other of the outer peripheral flow path and the inner peripheral flow path. In this case, the cylindrical valve is moved by the driving portion so as to change flow path areas of the first valve flow path and the second valve flow path thereby changing quantity of fluid flowing through the outer peripheral flow path and fluid flowing through the inner peripheral flow path of the cylindrical valve.

The driving portion can adopt a style comprising a driving motor mounted on the base body and a deceleration converting section for converting a rotary motion of the driving motor to a linear motion of the cylindrical valve. The deceleration converting section may have a direct-acting shaft capable of moving in the axial direction of the cylindrical valve with a rotation of the driving motor. Because the deceleration can be achieved when the rotary motion is converted to the linear motion, it is advantageous for controlling a moving of the cylindrical valve in its opening/closing direction at a high precision.

The cylindrical valve may include an outer cylindrical section having the outer peripheral wall face which forms the outer peripheral flow path and the inner peripheral wall face which forms the inner peripheral flow path, an inner cylindrical section having a shaft hole provided on the side of an inner periphery of the outer cylindrical section and arm sections for connecting the outer cylindrical sections to the inner cylindrical sections. Then, the initial position in the axial direction of the cylindrical valve with respect to the direct-acting shaft can be adjusted by advancing or retracting a male thread section formed in the outer peripheral face of the direct-acting shaft with respect to a female thread section formed in the inner peripheral face of a shaft hole of the inner cylindrical section of the cylindrical valve with the both thread sections meshing with each other. In this case, because the initial position in the axial direction of the cylindrical valve with respect to the direct-acting shaft can be adjusted by the above-described advancing/retracting in the meshing condition, the flow path areas of the first valve flow path and second valve flow path at the initial position can be adjusted.

The fluid valve apparatus may further comprise an urging force generating section for generating an urging force for urging from one end section to the other end section in the axial direction of the cylindrical valve. In this case, because the urging force for urging from the one end section to the other end section in the axial direction of the cylindrical valve is generated in the axial direction of the cylindrical valve, the gap (backlash between threads or teeth) in the driving power transmitting mechanism can be reduced, thereby improving reproducibility of the opening degree of the cylindrical valve.

The urging force generating section may adopt a style for generating an urging force for urging from the one end section to the other end section in the axial direction of the cylindrical valve by setting a pressure receiving area on the side of the one end section in the axial direction of the cylindrical valve larger than a pressure receiving area on the side of the other end section in the axial direction of the cylindrical valve. Further, the urging force generating section may adopt a spring member which generates the urging force for urging from the one end section to the other end section in the axial direction of the cylindrical valve.

The foreign matter invasion blocking section for keeping fluid flowing through at least one of the outer peripheral flow path and the inner peripheral flow path of the cylindrical valve apart from the driving portion may be provided so as to block invasion of foreign matter contained in fluid. The foreign matter invasion blocking section may be provided on at least one or both of the cylindrical valve and the base body.

As an apparatus connected to the fluid valve apparatus of the present invention, a fuel battery stack can be exemplified. In this case, the fluid valve apparatus of the present invention may be provided in the downstream or the upstream of the fuel battery stack. The fuel battery may be vehicle loaded battery or a stationary battery. As a flow path in the upstream of the fuel battery stack, at least one of a flow path through which oxidizer gas (generally, air) before power generation flows and a flow path through which fuel gas before power generation flows may be adopted. As a flow path in the downstream of the fuel battery, at least one of a flow path through which oxidizing off gas (generally, air after power generation) after power generation flows and a flow path through which fuel off gas after power generation flows may be adopted.

Hereinafter, the first embodiment of the present invention will be described with reference to FIGS. 1–5. As shown in FIG. 1, the fluid valve apparatus of this embodiment is disposed in the downstream of a stack 9 acting as a device and adjusts the pressure of fluid (air pressure) in the stack 9, and has a base body 1 connected to a fluid outlet 9a of the stack 9 through a supply pipe 90, the supply pipe 90 being connected to a joint device 92 via a sealing member 92p. The stack 9 is an assembly of solid polymer film type fuel batteries. Fluid (air after power generation) discharged from the stack 9 of the fuel batteries flows to the fluid valve apparatus through the supply pipe 90. Generally, fluid (air after power generation) discharged from the stack of the fuel batteries is hot because it is heated by power generation action and contains a large amount of steam or water. The power generation reaction of the fuel battery generates water.

As shown in FIG. 1, the base body 1 includes a first body 11, a second body 12 and a third body 13, which are connected to each other. The first body 11 includes a fluid intake 20 which is disposed in the upstream of the first body 11 and through which fluid (air) flows in, a fluid outlet 21 which is disposed in the downstream of the first body 11 and through which fluid is discharged and a valve accommodation chamber 22 formed between the fluid intake 20 and the fluid outlet 21. The fluid intake 20 is formed circularly and located in the downstream of the stack formed of the fuel batteries and connected to the supply pipe 90. The fluid outlet 21 is formed circularly and connected to a humidifier 98 through a discharge pipe 97. In the meantime, as shown in FIG. 1, the directions of the fluid intake 20 and the fluid outlet 21 are different. That is, the axis A1 of the fluid intake 20 and the axis A2 of the fluid outlet 21 are along the lateral direction and if viewing on a sectional drawing shown in FIG. 1, perpendicular to each other.

Figure 2:
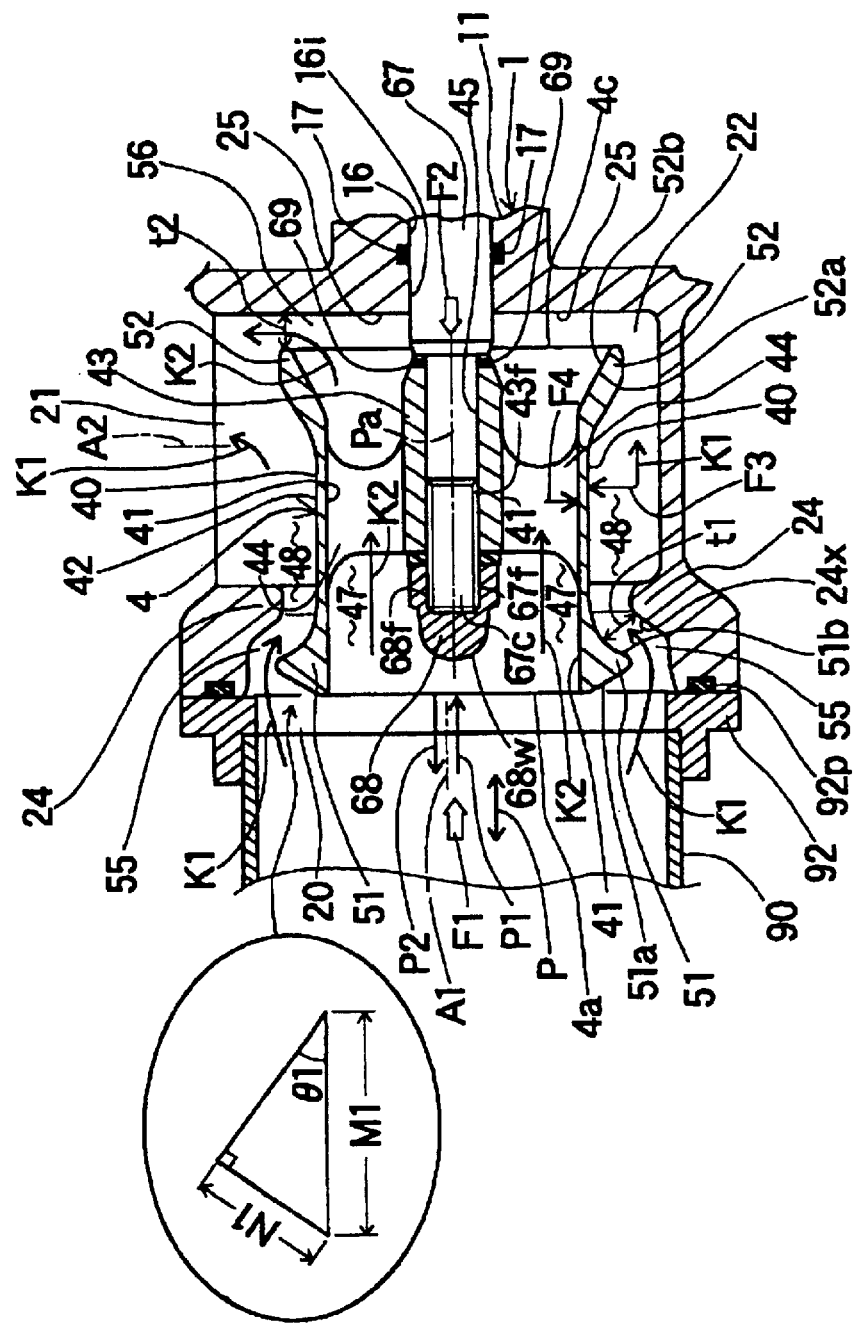
FIG. 2 is a sectional view of major components of the fluid valve apparatus in a state in which the cylindrical valve is opened.

As shown in FIG. 2, the first body 11 of the base body 1 has a first valve receiving section 24 formed on the side of the fluid intake 20 opposing the valve accommodation chamber 22 and a second valve receiving section 25 formed on the side of the fluid outlet 21 opposing the valve accommodation chamber 22. The first valve receiving section 24 is formed in a ring-like shape and protruded in an inward direction of the diameter, so that a first valve section 51 of the cylindrical valve 4 described later is capable of approaching or settling on the first valve receiving section 24. The second valve receiving section 25 is formed in a flat plane and a second valve section 52 of the cylindrical valve 4 described later is capable of approaching or settling on the second valve receiving section 25.

As shown in FIG. 2, the cylindrical valve 4 is accommodated movably along the axial direction (direction of an arrow P) in the valve accommodation chamber 22 of the base body 1. The axis Pa of the cylindrical valve 4 is set along the axis A1 of the fluid intake 20 and the cylindrical valve 4 is capable of moving along the axis A1 of the fluid intake 20. More specifically, the cylindrical valve 4 is disposed coaxially with the fluid intake 20 such that it opposes the fluid intake 20. The axis Pa of the cylindrical valve 4 is set on an extension of the axis A1 of the fluid intake 20. In the meantime, the axis Pa of the cylindrical valve 4 is set along the lateral direction.

Figure 4:
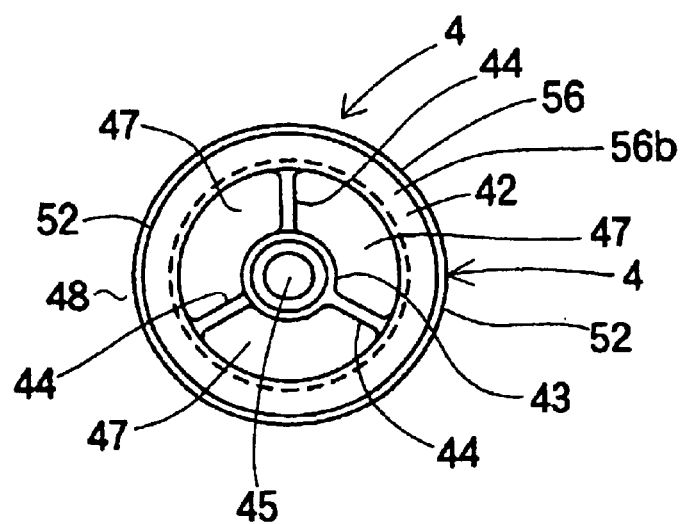
FIG. 4 is an end face diagram showing an axial end of the cylindrical valve.
Figure 5:
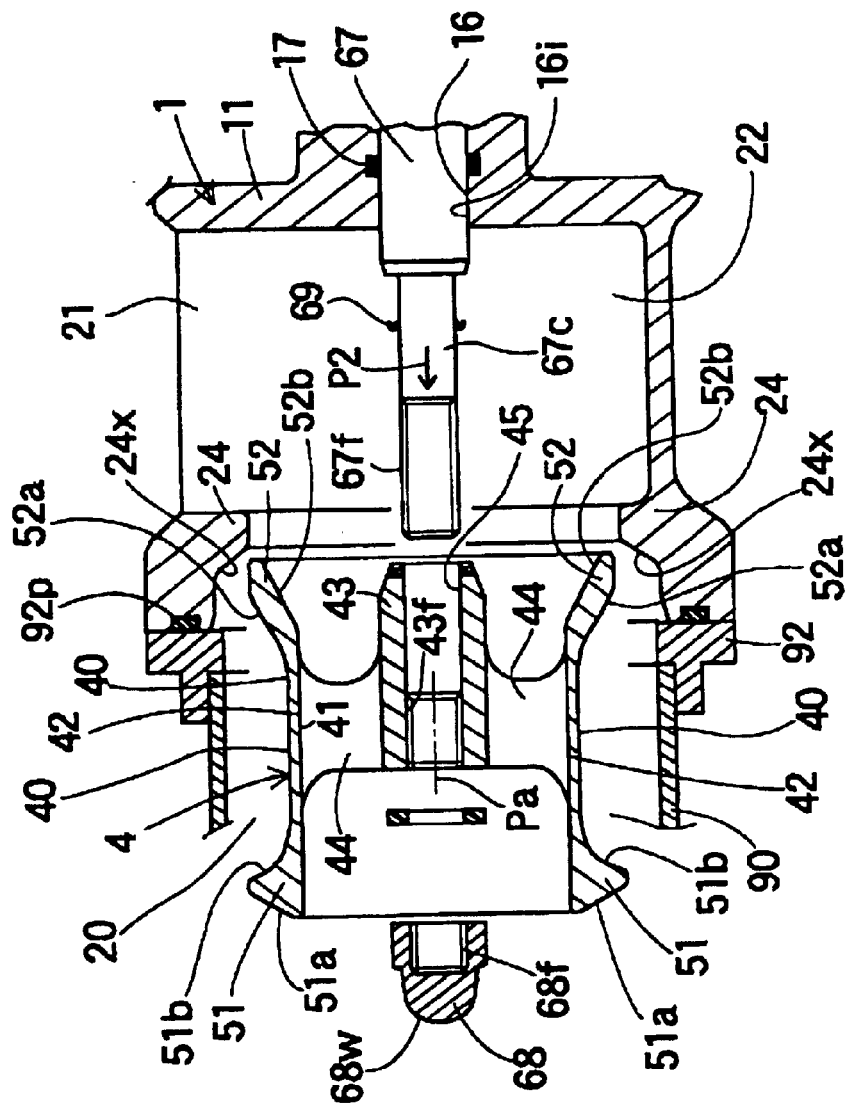
FIG. 5 is a sectional view of major components indicating a state before the cylindrical valve is mounted on a direct-acting shaft.

The cylindrical valve 4 is formed cylindrically of hard material such as metal (for example, stainless steel, carbon steel, and other iron base material, aluminum alloy base, titan alloy base). As shown in FIG. 5, the cylindrical valve 4 has an outer cylindrical section 42, an inner cylindrical section 43 provided on the side of an inner periphery of the outer cylindrical section 42 and multiple arm sections 44 extended in the radius direction for connecting the outer cylindrical section 42 to the inner cylindrical section 43. The inner cylindrical section 43 is disposed coaxially with the outer cylindrical section 42 and has an axial hole 45 which goes through in the axial direction of the cylindrical valve 4, the axial hole being located in the center thereof. As shown in FIG. 2, the outer cylindrical section 42 of the cylindrical valve 4 has an outer peripheral wall face 40 and an inner peripheral wall face 41. The outer peripheral wall face 40 forms an outer peripheral flow path 48 through which fluid flows from the fluid intake 20 to the fluid outlet 21. The inner peripheral wall face 41 forms an inner peripheral flow path 47 through which fluid flows from the fluid intake 20 to the fluid outlet 21, with the inner cylindrical section 43. In the meantime, the arm section 44, as shown in FIG. 4, is formed in a small width so as to secure a flow path sectional area of the inner peripheral flow path 47.

As shown in FIG. 5, a ring-like first valve section 51 is formed on the side of an end section (upstream side) in the axial direction of the outer cylindrical section 42 of the cylindrical valve 4 as if it is expanded around the axis Pa of the cylindrical valve 4. The first valve section 51 is thicker than the wall at an intermediate section of the outer cylindrical section 42 and comprised of a ring-like first slope face 51a whose outside diameter is increased as it goes from the upstream to the downstream and a ring-like second slope face 51b whose outside diameter is decreased as it goes from the upstream to the downstream.

As shown in FIG. 5, a ring-like second valve section 52 is formed on the side of the other end section (downstream side) in the axial direction of the cylindrical valve 4 as if it is expanded around the axis Pa of the cylindrical valve 4. As shown in FIG. 5, the second valve section 52 of the cylindrical valve 4 is thicker than the wall at an intermediate section of the outer cylindrical section 42 and comprised of a ring-like third slope face 52a whose outside diameter is increased as it goes from the upstream to the downstream and a ring-like fourth slope face 52b whose inside diameter is increased as it goes from the upstream to the downstream.

Because the second valve section 52 of the cylindrical valve 4 is expanded like a ring in the direction of the outside diameter of the outer cylindrical section 42, fluid can be introduced along the third slope face 52a and the fourth slope face 52b of the second valve section 52 more easily, so that it is advantageous to keep the fluid away from an intake 16i of a main hole 16 in a second body 12. Thus, even if any minute foreign matter happens to be contained in the fluid, advantageously, invasion of such minute foreign matter to the side of the driving portion 6 through the intake 16i of the main hole 16 is suppressed.

As shown in FIGS. 1, 2, a first valve flow path 55 is formed by the first valve section 51 of the cylindrical valve 4 and the first valve receiving section 24 of the base body 1. The first valve flow path 55 forms a ring-like configuration around the axis Pa of the cylindrical valve 4. The first valve flow path 55 communicates with an outer peripheral flow path 48 and the fluid intake 20, so that fluid (air) flows through the outer peripheral flow path 48 of the cylindrical valve 4.

As shown in FIGS. 1, 2, a second valve flow path 56 is formed by the second valve section 52 of the cylindrical valve 4 and the second valve receiving section 25 of the base body 1. The second valve flow path 56 forms a ring-like configuration around the axis Pa of the cylindrical valve 4. The second valve flow path 56 communicates with the inner peripheral flow path 47 and the fluid outlet 21, so that fluid flows through the inner peripheral flow path 47 in the cylindrical sleeve 4.

According to this embodiment, in the cylindrical valve 4, when its inside diameter size is assumed to be 100 relatively, the axial length size is less than 200. That reason is that because the cylindrical valve 4 is supported on one side by a direct-acting shaft 67 as shown in FIG. 1, the supporting stability of the cylindrical valve 4 is improved.

As shown in FIG. 1, the base body 1 has a driving portion 6 for moving cylindrical valve 4 along the axial direction in a direction for adjusting the degree of opening of the cylindrical valve 4. The driving portion 6 comprises a driving motor 62 which is fixed on the base body 1 and has a motor shaft 61 which rotates and a deceleration converting section 63 which converts the rotary motion of the motor shaft 61 of the driving motor 62 to a linear motion of the cylindrical valve 4. The driving motor 62 is constituted of a stepping motor which is covered with a cover 62m and in which a motor shaft 61 is rotated depending on the number of an input pulse.

The deceleration converting section 63 comprises an engaging section 64 which is held by the motor shaft 61 of the driving motor 62 coaxially and rotated integrally with the motor shaft 61, a rotation gear member 65 which is connected to the engaging section 64 coaxially and rotated integrally with the engaging section 64 and a long direct-acting shaft 67 which is connected to the rotation gear member 65 coaxially.

As shown in FIG. 1, the rotation gear member 65 is held rotatably by a bearing 68a between the first body 11 and the second body 12. The rotation gear member 65 has outer teeth 66 and is held by a first seat 69a and a second seat 69b. As a result, although the rotation gear member 65 can be rotated in the circumferential direction, it cannot be moved in the length direction of the rotation gear member 65, that is, in the length direction (direction of an arrow P) of the cylindrical valve 4. In the meantime, the length direction (direction of an arrow P) of the cylindrical valve 4 is extended along the axis of the direct-acting shaft 67.

As shown in FIG. 1, the direct-acting shaft 67 is connected coaxially to the rotation gear member 65 and comprises a flange-like slide section 67x which slides along a sliding face 16r of the main hole 16 in the first body 11 of the base body 1 and a shaft section 67c exposed from the second body 12, these components being disposed coaxially. A second male thread section 67f on which the cylindrical valve 4 is to be mounted is formed on an outer circumferential section of the shaft section 67c. Because the sliding section 67x slides on the sliding face 16r of the main hole 16, the direct-acting shaft 67 is capable of moving in the length direction (direction of an arrow P) of the main hole 16 in the first body 11.

As shown in FIG. 1, a first female thread section 65k is formed in an inner circumferential face of the rotation gear member 65. A first male thread section 67k is formed in an outer circumferential face of the direct-acting shaft 67. The first male thread section 67k meshes with the first female thread section 65k of the rotation gear member 65 such that it is capable of advancing or retracting. Therefore, if the rotation gear member 65 is rotated in a direction from that position without advancing or retracting, its rotation motion is converted to a linear motion of the direct-acting shaft 67, so that the direct-acting shaft 67 is moved linearly in a direction (direction of an arrow P1) along the length direction. Likewise if the rotation gear member 65 is rotated in the other direction from that position without advancing or retracting, its motion is converted to a linear motion of the direct-acting shaft 67, so that the direct-acting shaft 67 is moved linearly in the other direction (direction of an arrow P2) along the length direction.

Assuming that when the number of pulses to be inputted to the driving motor 62 is 100 as a relative notation, the rotation gear member 65 is rotated one turn so that the first female thread section 65k formed in an inner circumferential face of the rotation gear member 65 is rotated one turn, it comes that the direct-acting shaft 67 is moved linearly in the axial direction by an amount similar to a pitch of the first female thread section 65k. Thus, a moving of the cylindrical valve 4 in its opening/closing direction per a pulse to be inputted to the driving motor 62 can be controlled every minute amount at a high accuracy.

As shown in FIG. 1, a sensor 7 for detecting a rotation of the driving motor 62 is mounted on the second body 12 of the base body 1 with a mounting screw 7w. A fan-like first intermediate gear 71 is held rotatably by the first body 11 and the second body 12 of the base body 1 through a bearing 68c. A circular second intermediate gear 72 is held rotatably by the first body 11 and the second body 12 of the base body 1 through a bearing 68d.

If the driving motor 62 is rotated, the rotation gear member 65 is rotated around its axis and then, a first intermediate gear member 71 having a gear section 71m which meshes with the outer teeth 66 of the rotation gear member 65 is rotated around an axis P8. Further, a second intermediate gear 72 having a gear section 72n which meshes with the gear section 71n of the first intermediate gear member 71 is rotated around an axis P9. Meanwhile, the first intermediate gear 71 and the second intermediate gear 72 are prohibited from moving in the axial direction thereof although they can rotate. Because the sensor 7 detects about an action of the second intermediate gear 72, the sensor 7 is capable of detecting a faulty rotation (step out or the like of a stepping motor) of the driving motor 62.

As shown in FIG. 2, a ring-like seal member 17 having foreign matter invasion suppressing function exists between an outer peripheral face of the direct-acting shaft 67 and the main hole 16 in the first body 11 of the base body 1. The seal member 17 seals a gap between an inner peripheral face of the main hole 16 and the outer peripheral face of the second shaft section 67b. Consequently, invasion of a foreign matter contained in fluid to the side of the driving portion 6 is suppressed. If the fluid is air discharged from the stack 9 of the fuel batteries after power generation, foreign matter such as carbon fine particles carried by electrodes of the stack 9 fuel batteries may be contained. As shown in FIG. 5, a second female thread section 43f capable of meshing with the second male thread section 67f is formed in an inner peripheral face of the axial hole 45 of the inner cylindrical section 43 of the cylindrical valve 4. When the cylindrical valve 4 is assembled, as shown in FIG. 5, the second male thread section 67f formed in the outer peripheral face of the shaft section 67c of the direct-acting shaft 67 is engaged with the second female thread section 43f in the cylindrical valve 4 such that it is capable of advancing or retracting. Consequently, the cylindrical valve 4 can be deflected with respect to the direct-acting shaft 67 and thus, the initial position of the cylindrical valve 4 in the axial direction of the direct-acting shaft 67 can be adjusted. In this case, if the second male thread section 67f is advanced or retracted with respect to the second female thread section 43f, the initial position in the axial direction of the cylindrical valve 4 with respect to the direct-acting shaft 67 can be adjusted. Thus, a flow path width t1 at the initial position of the first valve flow path 55 and a flow path width t2 at the initial position of the second valve flow path 56 can be adjusted at precision. As a result, the flow path sectional area of the first valve flow path 55 and the flow path sectional area of the second valve flow path 56 can be adjusted at precision.

At the time of assembly of the cylindrical valve 4, as understood from FIG. 5, after a ring-like spring member 69 is mounted on an exposed section of the direct-acting shaft 67, the second female thread section 43f of the inner cylindrical section 43 of the cylindrical valve 4 is engaged with the second male thread section 67f of the direct-acting shaft 67 so as to mount the cylindrical valve 4 on the direct-acting shaft 67. Then, the initial position of the cylindrical valve 4 in the axial direction of the direct-acting shaft 67 is set up and after that, a female thread section 68f in a cap nut section 68 (valve tightening means) is engaged with a front end section of the second male thread section 67f of the direct-acting shaft 67. With this condition, the cylindrical valve is supported on one side by the direct-acting shaft 67.

As shown in FIGS. 5, 2, the direct-acting shaft 67 is provided with a spring member 69 which can function as a ring-like urging means capable of exerting its spring performance in the axial direction. Because the inner cylindrical section 43 of the cylindrical valve 4 is always urged in the axial direction (direction of an arrow P2) by a spring force of the spring member 69, the cylindrical valve 4 is prevented from playing completely. To secure smooth fluid flow, the cap nut section 68 has a three-dimensional convex circular face 68w capable of opposing the fluid intake 20. As shown in FIG. 2, the cap nut section 68 is retracted to the downstream with respect to the first valve section 51 of the cylindrical valve 4.

Upon use, as understood from FIG. 1, fluid compressed by the compressor 94 (air before power generation) is humidified by the humidifier 98 and supplied to the intake 9b of the stack 9 through the flow path 95, in which it is used for power generation reaction in the fuel batteries of the stack 9. Fuel-contained gas (hydrogen-contained gas) is also supplied to the stack 9 through a flow path 99. Fluid (air after power generation) discharged from the stack 9 reaches the fluid intake 20 of the base body 1 of the fluid valve apparatus through the supply pipe 90.

A control unit 600 controls the driving motor 62 depending on an operating condition of the stack 9 so as to increase or decrease the opening degree of the cylindrical valve 4. To decrease fluid pressure (pneumatic pressure) in the stack 9, the opening degree of the cylindrical valve 4 connected to the stack 9 is increased by the control unit 600. To increase the opening degree of the cylindrical valve 4, the driving motor 62 is driven by the control unit 60 so as to move the cylindrical valve 4 in the direction of increasing the opening degree, that is, in a direction of the arrow P2. Because the driving motor 62 is a stepping motor which is rotated depending on the number of input pulses, the opening/closing of the cylindrical valve 4 is controlled at a high precision. To decrease the fluid pressure (air pressure) in the stack 9, as described above, the cylindrical valve 4 is moved in the direction of increasing the opening degree or in the direction of the arrow P2 by the control unit 600.

Consequently, as shown in FIG. 2, the first valve section 51 of the cylindrical valve 4 is moved in the direction of an arrow P2 so that it departs from the first valve receiving section 24 and consequently, the flow path width d1 (see FIG. 2) of the first valve flow path 55 is increased, thereby the flow path area of the first valve flow path 55 being increased. Likewise, the second valve section 52 of the cylindrical valve 4 is moved in the direction of the arrow P2 and departs from the second valve receiving section 25. Consequently, the flow path width t2 (see FIG. 2) of the second valve flow path 56 is increased, thereby the flow path area of the second valve flow path 56 being increased. In this case, fluid supplied to the fluid intake 20 of the base body 1 flows in the direction of an arrow K1 (see FIG. 2) so that it flows through the outer peripheral flow path 48 on the side of the outer peripheral wall face 40 of the cylindrical valve 4 and enters into the valve accommodation chamber 22. At the same time, it flows in the direction of an arrow K2 so that it flows through the inner peripheral flow path 47 on the side of the inner peripheral wall face 41 of the cylindrical valve 4 and the second valve flow path 56. Then, it enters into the valve accommodation chamber 22 and then is discharged to the humidifier 98 from the fluid outlet 21.

Because according to this embodiment, as described above, both the outer peripheral flow path 48 and the inner peripheral flow path 47 of the cylindrical valve 4 serve as the flow paths, the quantity of fluid flow which can be adjusted by the fluid valve apparatus is secured. Thus, this embodiment is suitable for a fluid valve apparatus connected to a stack 9 in which a large amount of fluid is required. The quantity of fluid flowing through the outer peripheral flow path 48 may be substantially the same as the quantity of fluid flowing through the inner peripheral flow path 47 or may be more or less different.

To increase the fluid pressure (air pressure) in the stack 9, the driving motor 62 is driven by the control unit 600 so as to move the cylindrical valve 4 in the direction of decreasing the opening degree or in the direction of the arrow P1. As a result, the first valve section 51 of the cylindrical valve 4 is moved in the direction of decreasing the opening degree or in the direction of the arrow P1, so that it approaches the first valve receiving section 24. Consequently, the flow path width t1 of the first valve flow path 55 is decreased thereby the flow path area of the first valve flow path 55 being decreased. Likewise, the second valve section 52 of the cylindrical valve 4 is moved in the direction of the arrow P1 so that it approaches the second valve receiving section 25.

Consequently, the flow path width t2 of the second valve flow path 56 is decreased, thereby the flow path area of the second valve flow path 56 being decreased. Thus, the quantity of fluid flowing through the first valve flow path 55 and the second valve flow path 56 is decreased. Therefore, the fluid pressure (air pressure) in the stack 9 located in the upstream of the fluid valve apparatus is adjusted to increase.

Figure 3:
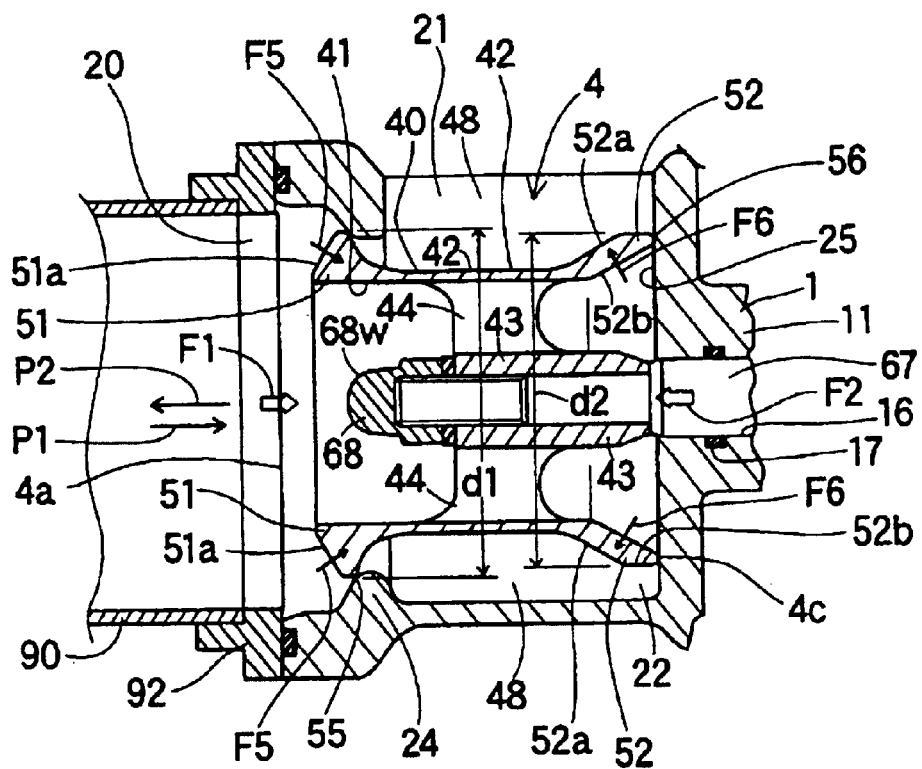
FIG. 3 is a sectional view of major components of the fluid valve apparatus in a state in which the cylindrical valve is closed.

To close the cylindrical valve 4, the cylindrical valve 4 is further moved by the driving motor 62 in the direction of decreasing the opening degree or in the direction of the arrow P1. Consequently, as shown in FIG. 3, the first valve section 51 of the cylindrical valve 4 is moved in the direction of the arrow P1 and contacts or comes nearest to the first valve receiving section 24 so as to close the first valve flow path 55. Then, the second valve section 52 is moved in the direction of the arrow P1 and contacts or comes nearest to the second valve receiving section 25 so as to close the second valve flow path 56. In the meantime, if the compressor 94 is stopped, supply of air to the stack 9 is stopped, so that basically, fluid flow in the cylindrical valve 4 is stopped.

According to this embodiment, as shown in FIG. 1, the cylindrical valve 4 is disposed in the valve accommodation chamber 22 of the base body 1 such that the shaft end section in the axial direction of the cylindrical valve 4 confronts fluid flowing from the fluid intake 20 to the fluid outlet 21. Fluid flowing from the fluid intake 20 into the valve accommodation chamber 22 opposes the shaft end section of the cylindrical valve 4. Thus, a pressure receiving area on which fluid acts in the cylindrical valve 4 can be reduced. Thus, when the opening degree of the cylindrical valve 4 is adjusted resisting fluid flow, a load applied to the cylindrical valve 4 can be reduced. Finally, an output of the driving motor 62 can be reduced, thereby making it possible to reduce the size and cost of the driving motor 62.

If fluid flowing from the fluid intake 20 to the fluid outlet 21 acts upon the first valve section 51 of the cylindrical valve 41, pressure is received from the fluid so that a urging force F1 (see FIG. 2) for urging from the side of an end section 4a (upstream side) in the axial direction of the cylindrical valve 4 to the side of the other end section (downstream side) acts upon the cylindrical valve 4.

Further if fluid in the inner peripheral flow path 47 acts on the second valve section 52 of the cylindrical valve 4, a urging force F2 (see FIG. 2) for urging from the side of the other end section 4c (downstream side) in the axial direction of the cylindrical valve 4 to the side of the one end section 4a (upstream side) acts on the cylindrical valve 4. According to this embodiment, although the urging force F1 is slightly larger than the urging force F2, both are similar forces (F1=F2+α) and their directions are opposite to each other.

Thus, most of the urging forces F1, F2 except a portion corresponding to α is substantially cancelled out by each other. Thus, there is produced such an advantage that a load resistance when the cylindrical valve 4 is opened or closed in a condition that fluid is flowing can be reduced, and consequently, the output of the driving motor can be reduced, which is advantageous for reduction of the size of the driving motor 62.

If explaining further, as shown in FIG. 3, a maximum outside diameter d1 of the first valve section 51 of the cylindrical valve 4 is set larger by Δd than the maximum outside diameter d2 of the second valve section 52. Consequently, a pressure receiving area which generates the urging force F1 on the side of the one end section 4a in the axial direction of the cylindrical valve 4 is set larger than a pressure receiving area which generates the urging force F2 on the side of the other end section 4c in the axial direction of the cylindrical valve 4 and consequently, an urging force generating section is formed. As a result, if it is assumed that the urging force for urging from the one end section 4a to the other end section 4c in the axial direction f the cylindrical valve 4 is F1 while the urging force for urging from the other end section 4c to the one end section 4a in the axial direction of the cylindrical valve 4 is F2, the urging force F1 is a force similar to the urging force F2 and their directions are opposite to each other. Thus, although most of the both are cancelled out by each other, the urging force F1 is set larger than the urging force F2 by an amount corresponding to α (F1=F2+α)

Because the urging force F1 is larger than the urging force F2 by the amount corresponding to α, when fluid flows through the fluid valve apparatus of this embodiment, the cylindrical valve 4 is urged in the direction of the arrow P1 from the one end section 4a (upstream side) to the other end section 4c (downstream side). As a result of this urging, a gap (backlash) between the first female thread section 65k of the rotation gear member 65 and the first male thread section 67k of the direct-acting shaft 67 and other clearances can be reduced. Consequently, deflection in the opening degree of the cylindrical valve 4 can be reduced for a long time advantageously and even if its usage period is extended, reproducibility of the opening degree of the cylindrical valve 4 can be maintained at a high precision and finally, the power generation performance of the stack 9 can be controlled excellently for a long time.

As understood from FIG. 2, fluid flowing through the outer peripheral flow path 48 of the cylindrical valve 4 acts upon the outer cylindrical section 42 of the cylindrical valve 4 centrifugally as a pressure F3 (see FIG. 2) which is applied to the outer peripheral wall face 40 of the outer cylindrical section 42 of the cylindrical valve 4. However, because the cylindrical valve 4 is formed cylindrically and the outer peripheral flow path 48 is formed entirely around the outer cylindrical section 42, an influence of the pressure F3 is substantially cancelled out. Further, fluid flowing through the inner peripheral flow path 47 of the cylindrical valve 4 acts on the inner peripheral wall face 41 of the cylindrical valve 4 radiantly as a pressure F4 (see FIG. 2). However, because the cylindrical valve 4 is formed cylindrically and the inner peripheral flow path 47 is formed entirely around the outer cylindrical section 42, an influence of the pressure F4 is cancelled out.

According to this embodiment, as described above, fluid supplied to the fluid intake 20 of the base body 1 flows in the direction of the arrow K1 and through the outer peripheral flow path 48 on the side of the outer peripheral wall face 40 of the cylindrical valve 4 while it flows in the direction of the arrow K2 and through the inner peripheral flow path 47 on the side of the inner peripheral wall face 41 of the cylindrical valve 4. Because fluid flows through both the outer peripheral flow path 48 and the inner peripheral flow path 47 in the cylindrical valve 4, the quantity of fluid which can be adjusted by the fluid valve apparatus is secured, being different from the technology stated in the Patent Publication 1. For this reason, this embodiment is suitable for a fluid valve apparatus connected to the stack 9 which requires control on a large amount of fluid (air).

According to this embodiment, the cylindrical valve 4, as shown in FIG. 5, comprises a outer cylindrical section 42, an inner cylindrical section 43, and multiple arm sections 44 extended in the radius direction for connecting the outer cylindrical section 42 to the inner cylindrical section 43. This embodiment is more advantageous for increasing the flow path area of the inner cylindrical flow path 74 on the side of the inner periphery of the cylindrical valve 4 as compared to the technology on the above-described patent publication 1.

According to this embodiment, as shown in FIGS. 1, 2, the cylindrical valve 4 is disposed in the valve accommodation chamber 22 of the base body 1 such that the shaft end section in the axial direction of the cylindrical valve 4 confronts fluid flowing from the fluid intake 20 to the fluid outlet 21. Thus, the pressure receiving face on which fluid acts in the cylindrical valve 4 is formed on the shaft end section and thus, the pressure receiving face on which it acts as the urging force can be reduced. For this reason, when the opening degree of the cylindrical valve 4 is adjusted resisting fluid flow, the load on the cylindrical valve 4 can be reduced and then, the output of the driving motor can be reduced. Thus, the size of the driving motor can be reduced, which is advantageous for reduction in weight and power consumption of the driving motor.

According to this embodiment, as shown in FIG. 2, the urging force F1 (urging force from upstream to downstream) by fluid pressure acts on one shaft end section of the cylindrical valve 4 while the urging force F2 (urging force from downstream to upstream) in an opposite direction by fluid pressure acts on the other shaft end section of the cylindrical valve 4. Because the magnitudes of the urging forces F1, F2 are similar to each other, most parts of the urging forces F1, F2 in opposite directions are cancelled out. In this case, when the cylindrical valve 4 is moved by the driving portion 6 resisting fluid flow, the load acting on the driving motor 62 can be further reduced and the output of the driving motor 62 can be reduced. Thus, reduction in size and power consumption of the driving motor 62 can be achieved.

According to this embodiment, the first valve section 51 of the cylindrical valve 4 has a first slope face 51a. If fluid flowing toward the cylindrical valve 4 strikes the first slope face 51a of the ring-like first valve section 51 of the cylindrical valve 4, a force F5 directed to the axis of the cylindrical valve 4 (see FIG. 3) is generated. Because a second slope face 51b of the fist valve section is formed along the entire periphery of the cylindrical valve 4, aligning action of suppressing deflection of the axis of the cylindrical valve 4 can be obtained. In the meantime, the aforementioned aligning action can be expected when the cylindrical valve 4 is opened as well as closed.

Further, the second valve section 52 formed on the other end section 4c of the cylindrical valve 4 has a third slope face 52a and a fourth slope face 52b. Fluid generates a force F6 (see FIG. 3) directed radiantly on the fourth slope face 52b of the ring-like second valve section 52 of the cylindrical valve 4 on the entire periphery of the second valve section 52 so as to secure aligning action of the cylindrical valve 4.

According to this embodiment, as shown in FIG. 3, the outside diameter of the first valve section 51 of the cylindrical valve 4 is set larger than the outside diameter d2 of the second valve section 52 by $\ddot{A}d$ (d1=d2+$\ddot{A}d$). As a result, the urging force F1 for urging from one end section 4a in the axial direction of the cylindrical valve 4 to the other end section 4c is larger than the urging force F2 for urging from the other end section 4c in the axial direction of the cylindrical valve 4 to the one end section 4a. Thus, a gap (backlash) between the first female thread section 65k of the rotation gear member 65 and the first male thread section 67k of the direct-acting shaft 67 and other clearances can be reduced. As a result, deflection in the opening degree of the cylindrical valve 4 can be reduced for a long time advantageously, so that reproducibility of the opening degree of the cylindrical valve 4 can be maintained at a high precision.

According to this embodiment, as shown in FIG. 2, the second slope face 51b of the first valve section 51 of the cylindrical valve 4 and a slope face 24x of the first valve receiving section 24 are inclined at an angle θ1 with respect to the axis Pa (axis of the valve accommodation chamber 22) of the cylindrical valve 4.

The flow path width t1 of the first valve flow path 55 is specified. Here, when the cylindrical valve 4 is moved along the direction of the arrows P1 and P2 which are the axial direction, if a change amount in the axial direction (directions of the arrows P1, P2) of the cylindrical valve 4 is assumed to be M1, the change amount of the flow path width t1 of the first valve flow path 55 is affected by an angle θ1, so that it becomes smaller than M1 and this is assumed as N1 (M1>N1). Thus, in driving the driving motor 62 constituted of a stepping motor, resolution for adjusting the flow path width t1 of the first valve flow path 55 can be increased so that the opening degree of the flow path width t1 of the first valve flow path 55 can be adjusted at a high precision.

When a pulse is inputted to the driving motor 62 constituted of a stepping motor, it is assumed that a distance in which the cylindrical valve 4 is moved in the directions of the arrows P1, P2 is M1. In this case, the change amount of the flow path width t1 of the first valve flow path 55 becomes smaller than M1 due to an influence of the angle θ1 and this change amount is N1 (M1>N1). As a result, the resolution capable of adjusting the flow path width t1 of the first valve flow path 55 can be made smaller than an amount corresponding to a pulse of the stepping motor, so that the flow path width t1 of the first valve flow path 55 can be adjusted at a high precision. Thus, a rotation angel of the stepping motor per a pulse can be obtained without such a small and expensive stepping motor being employed. Therefore, this embodiment is advantageous for reduction of the price of the driving motor 62 constituted of the stepping motor.

Second Embodiment

Figure 6:
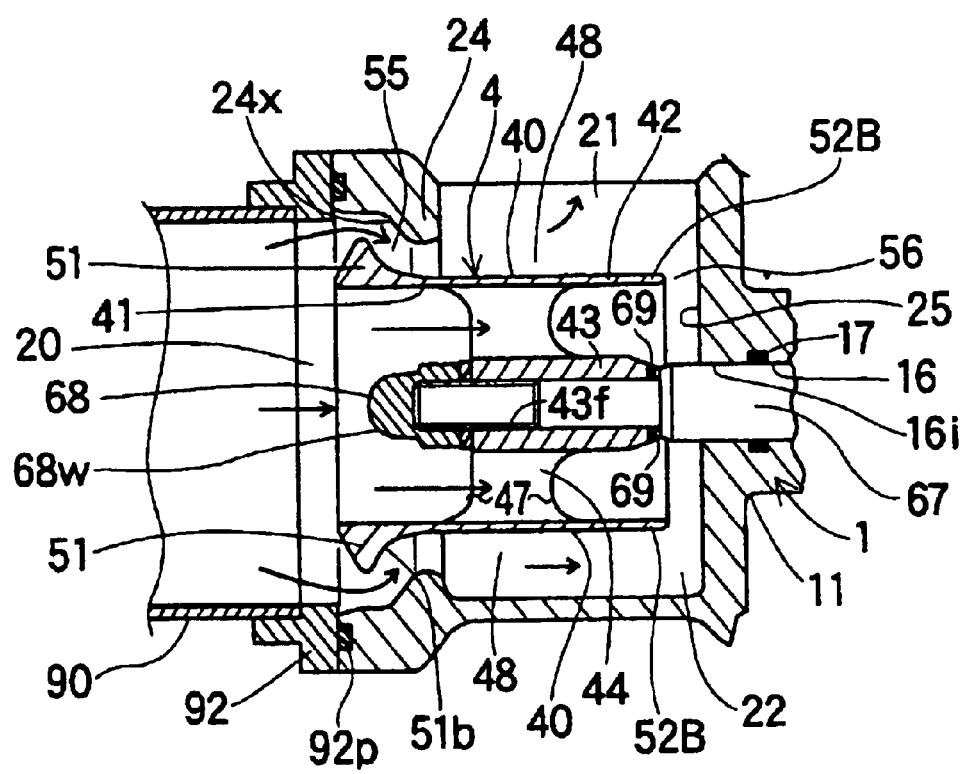
FIG. 6 is a sectional view of major components of the fluid valve apparatus according to the second embodiment.

FIG. 6 shows the second embodiment. The second embodiment has basically the same configuration as the first embodiment and like reference numerals are attached to like components. The second embodiment exerts basically the same operation and effect. Different point from the first embodiment will be described. According to this embodiment, a second valve section 52B of the cylindrical valve 4 is formed in a linear cylindrical configuration and extended along the axis Pa.

Third Embodiment

Figure 7:
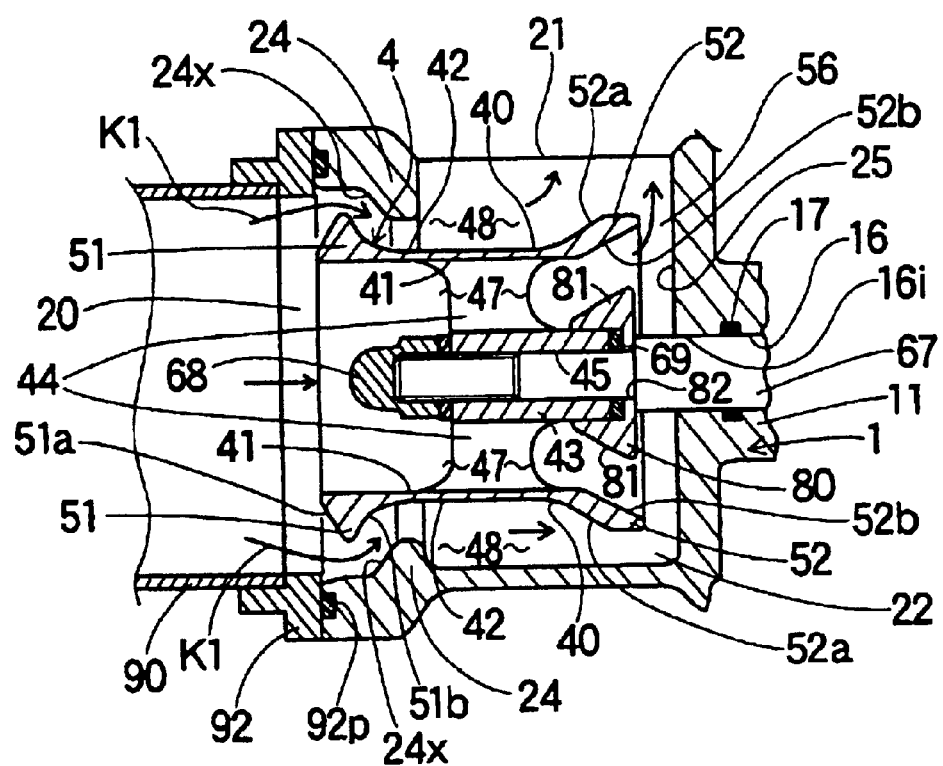
FIG. 7 is a sectional view of major components of the fluid valve apparatus according to the third embodiment.

FIG. 7 shows the third embodiment. The third embodiment has basically the same configuration as the first embodiment and like reference numerals are attached to like components. The third embodiment exerts the same operation and effect. Hereinafter, different points from the first embodiment will be described. As shown in FIG. 7, the cylindrical valve 4 comprises the outer cylindrical section 42 having the outer peripheral wall face 40 which forms the outer peripheral flow path 48 and the inner peripheral wall face 41 which forms the inner peripheral flow path 47, the inner cylindrical section 43 having the shaft hole 45, provided on the side of the side of an inner periphery of the outer cylindrical section 42 and multiple arm sections 44 extended in the radius direction for connecting the outer cylindrical section 42 with the inner cylindrical section 43. The outer cylindrical section 42 of the cylindrical valve 4 is comprised of the outer peripheral wall face 40 which forms the outer peripheral flow path 48 through which fluid flows from the fluid intake 20 to the fluid outlet 21 and the inner peripheral wall face 41 which forms the inner peripheral flow path 47 through which fluid flows from the fluid intake 20 to the fluid outlet 21. The outer cylindrical section 42 of the cylindrical valve 4 has the first valve section 51 formed on one end section (upstream side) in the axial direction of the cylindrical valve 4 such that it is expanded and the second valve section 52 formed on the other end section (downstream side) in the axial direction of the cylindrical valve 4 such that it is expanded.

As shown in FIG. 7, the first valve section 51 of the cylindrical valve 4 is expanded cylindrically in the direction of the outside diameter of the outer cylindrical section 42 and made thicker than the other sections. Likewise, the third slope face 52a and the fourth slope face 52b of the second valve section 52 of the cylindrical valve 4 are expanded cylindrically in the direction of the outside diameter of the outer cylindrical section 42. Because the third slope face 52a and the fourth slope face 52b of the second valve section 52 are expanded cylindrically in the direction of the outside diameter of the outer cylindrical section 42, even if any foreign matter such as minute particles is contained in fluid, fluid can be brought apart from the intake 16i of the main hole 16. Consequently, invasion of such foreign matter as carbon particles contained in fluid into the driving portion 6 through the intake 16i of the main hole 16 can be suppressed.

According to this embodiment as shown in FIG. 7, a foreign matter invasion blocking section 80 is used to suppress invasion of foreign matter contained in fluid from invasion into the driving portion 6. The foreign matter invasion blocking section 80 is disposed on the direct-acting shaft 67 together with the cylindrical valve 4 such that it opposes the intake 16i of the main hole 16 in the first body 11 of the base body 1 and comprised of a conical expanded slope face 81 having an outside diameter expanded in the direction of the outside diameter as it goes toward the driving motor 62 and a mounting hole 82 which can be fit to the direct-acting shaft 67. The expanded slope face 81 is provided continuously in the peripheral direction. Because the foreign matter invasion blocking section 80 having the expanded slope face 81 is provided so as to oppose the intake 16$i$ of the main hole 16, fluid can be brought apart from the intake 16$i$ of the main hole 16, thereby suppressing foreign matter contained in fluid from invading to the side of the driving portion 6.

Fourth Embodiment

Figure 8:
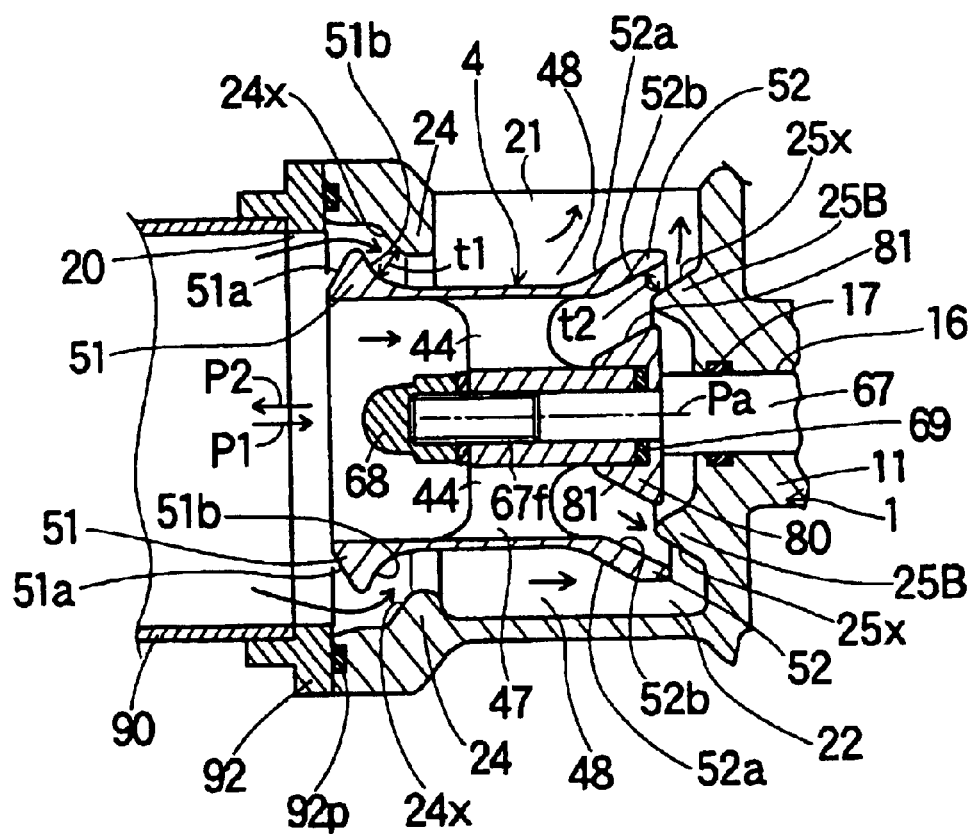
FIG. 8 is a sectional view of major components of the fluid valve apparatus according to the fourth embodiment.

FIG. 8 shows a fourth embodiment. The fourth embodiment has basically the same configuration as the first embodiment and basically exerts the same operation and effect. Like reference numerals are attached to like components. Mainly different components from the first embodiment will be described. According to this embodiment also, like the first embodiment, the second slope face 51$b$ of the first valve section 51 of the cylindrical valve 4 and a slope face 24$x$ of the first valve receiving section 24 are inclined at an angle θ1 with respect to the axis Pa of the cylindrical valve 4. The flow path width of the first valve flow path 55 is specified as t1. Here, when the cylindrical valve 4 is moved along the directions of the arrows P1, P2 which are the axial direction, if a change amount in the axial direction (directions of the arrows P1, P2) of the cylindrical valve 4 is assumed to be M1 as described previously, the change amount of the flow path width t1 of the first valve flow path 55 becomes smaller than M1 and this is assumed as N1 (M1>N1). Meanwhile, N1=M1·sin θ1. Thus, resolution for adjusting the flow path width t1 of the first valve flow path 55 can be made finer, so that the flow path width t1 of the first valve flow path 55 can be adjusted at a high precision.

Further according to this embodiment, as shown in FIG. 8, the second valve receiving section 25B is formed in the configuration of an expanded ring. The fourth slope face 52$b$ of the second valve section 52 of the cylindrical valve 4 and the inclined face 25$x$ of the second valve receiving section 25 are inclined at an angle θ2 with respect to the axis Pa of the cylindrical valve 4. The flow path width of the second valve flow path 56 is specified as t2.

Figure 9:
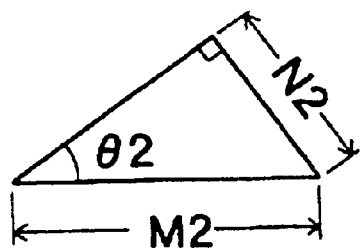
FIG. 9 is an explanatory diagram for explaining changes in flow path width of a second valve section of the cylindrical valve according to the fourth embodiment.

When the cylindrical valve 4 is moved along the directions of the arrows P1, P2, which are the axial directions, if the change amount in the axial directions (directions of the arrows P1, P2) of the cylindrical valve 4 is assumed to be M2 (see FIG. 9), the change amount of the flow path width t2 of the second valve flow path 56 becomes smaller than M2 because it is affected by the angle θ02 and this is assumed to be N2 (see FIG. 9) (M2>N2). Thus, resolution for adjusting the flow path width t2 of the second valve flow path 56 can be made smaller than a change amount corresponding to a pulse of the stepping motor, thereby making it possible to adjust the flow path width t2 of the second valve flow path 56 at a high precision.

Fifth Embodiment

Figure 10:
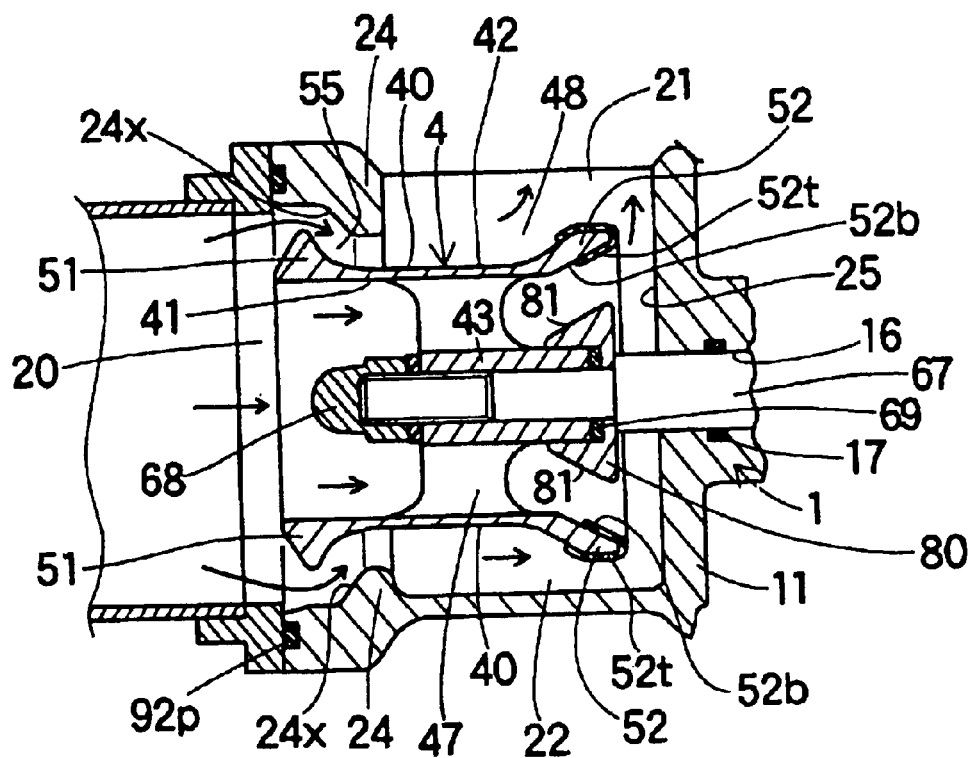
FIG. 10 is a sectional view of major components of the fluid valve apparatus according to the fifth embodiment.

FIG. 10 shows a fifth embodiment. The fifth embodiment has basically the same configuration as the first embodiment and basically exerts the same operation and effect. Like reference numerals are attached to like components. Mainly different components from the first embodiment will be described. According to this embodiment, the second valve section 52 of the cylindrical valve 4 is provided with a mild member 52$t$ so as to intensify sealing performance when the valve is closed. In the meantime, the mild member 52$t$ can be mounted on at least one of the first valve section 51 and the second valve section 52. Depending on the case, it may be mounted on at least one of the first valve receiving section 24 and the second valve receiving section 25.

Sixth Embodiment

Figure 11:
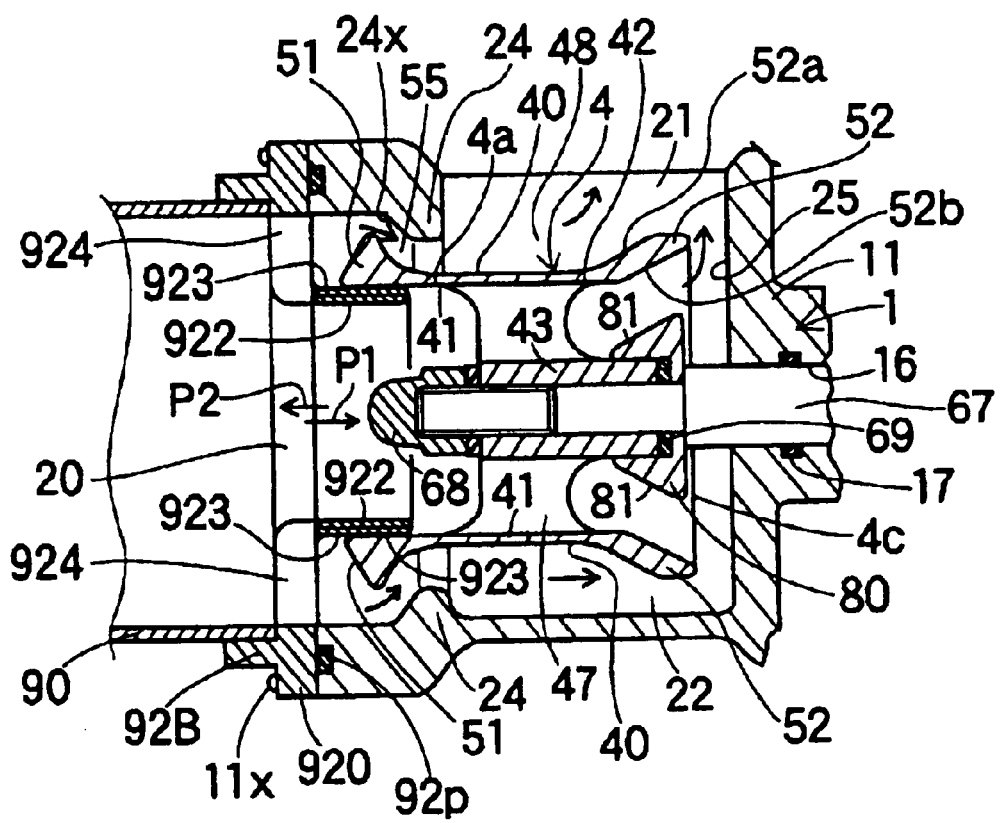
FIG. 11 is a sectional view of major components of the fluid valve apparatus according to the sixth embodiment.

FIG. 11 shows the sixth embodiment. The sixth embodiment has basically the same configuration as the first embodiment and basically exerts the same operation and effect. Like reference numerals are attached to like components. Mainly different components from the first embodiment will be described. According to this embodiment, the first body 11 of the base body 1 is provided with a linking device 92B for linking a supply pipe 90 in the vicinity of the fluid intake 20. The linking device 92B functions as a guide section for guiding the cylindrical valve 4 and comprises a main body section 920 which is fixed to the first body 11 of the base body 1 with a fixture 11$x$, a ring-like sliding section 922 which is extended in the axial direction on the side of the one end section 4$a$ of the cylindrical valve 4 and multiple arm sections 924 for connecting the main body 922 with the sliding section 922. The sliding section 920 holds the one end section 4$a$ in the axial direction of the cylindrical valve 4 slidably. The sliding section 922 has a sliding plane 923 extended in the axial direction (directions of the arrows P1, P2) of the cylindrical valve 4. The sliding plane 923 opposes the one end section 4$a$ in the axial direction of the cylindrical valve 4 and possesses solid lubricity to intensify the sliding performance of the one end section 4$a$. The one end section 4$a$ in the axial direction of the cylindrical valve 4 is supported by the sliding section 922 while the other end section 4$c$ in the axial direction of the cylindrical valve 4 is supported by the direct-acting shaft 67. That is, the cylindrical valve 4 is supported on both sides.

Others

Although according to the above-described respective embodiments, the driving motor 62 is employed as the stepping motor, it is permissible to use other motors, for example, a DC motor. Depending on the driving motor 62, it is possible to disuse the sensor 7 and it is permissible to disuse the first intermediate gear member 71 and the second intermediate gear 72 which are used for detection of the sensor 7. Although according to the above-described respective embodiments, the fluid valve apparatus is disposed in the downstream of the stack 9, it may be disposed in the upstream of the stack 9. Although according to the above-described respective embodiments, the axis Pa of the cylindrical valve 4, the hole axis A1 of the fluid intake 20 and the hole axis A2 of the fluid outlet 21 are arranged along a lateral direction, at least one of them may be disposed along a longitudinal direction.

Although according to the above respective embodiments, the deceleration converting section 63 for converting a rotary motion of the driving motor 62 to a linear motion of the cylindrical valve 4 comprises the engaging section 64, the rotation gear section 65 which is connected to the engaging section 64 coaxially and rotated integrally with the engaging section 64 and the direct-acting shaft 67, the present invention is not restricted to this configuration. The driving motor for driving the cylindrical valve 4 may be a directly acting linear motor depending on the case, which may drive the cylindrical valve 4 directly. Although the cylindrical valve 4 is formed cylindrically, it may be formed in a rectangular solid configuration.

Although according to the respective embodiments, the fluid valve apparatus is applied to a vehicle loaded fuel battery system, the present invention is not restricted to this example, but may be applied to a stationary fuel battery system or other fuel battery system. Alternatively, this may be applied to an application for feeding air to a combustion system or the like other than the fuel battery system. Additionally, the apparatus of the present invention is not restricted to the above described respective embodiments and may be modified within a scope not departing from the gist of the present invention.

A following technical philosophy can be grasped from the above description. The fluid valve apparatus comprising: a base body having a fluid intake through which fluid flows in, a fluid outlet through which fluid is discharged, and a valve accommodation chamber formed between the fluid intake and the fluid outlet; a cylindrical valve accommodated movably in the valve accommodation chamber in the base body; and a driving portion for moving the cylindrical valve in a direction of adjusting the opening degree of the cylindrical valve, Said cylindrical valve including:

An outer peripheral wall face which forms an outer peripheral flow path in the cylindrical valve so that fluid flows from the fluid intake to the fluid outlet; and A first valve section which forms the first valve flow path in said cylindrical valve with the first receiving section of said base body so that fluid flows through said outer peripheral flow path, wherein the cylindrical valve is moved by the driving portion so as to change flow path areas of the first valve flow path and thereby changing the quantity of fluid flowing through the outer peripheral flow path, while said cylindrical valve is disposed in the valve accommodation chamber in said base body such that the shaft end section in the axial direction thereof confronts fluid flowing from said fluid intake to said fluid outlet.

Because the cylindrical valve is disposed in the valve accommodation chamber in the base body such that the shaft end section in the axial direction of the cylindrical valve confronts fluid flowing from the fluid intake to the fluid outlet, the pressure receiving area on which the fluid acts in the cylindrical valve can be reduced. Thus, when the opening degree of the cylindrical valve is adjusted resisting fluid flow, the load acting on the cylindrical valve can be reduced and the output of the driving portion which drives the cylindrical valve can be reduced. Consequently, reduction of the size of the driving portion can be achieved and thus, this modification is advantageous for reduction of the weight and power consumption in the fluid valve apparatus. In conclusion, this modification is suitable for a vehicle-loaded or stationary fuel battery system the size of which has been demanded to be reduced.

In the fluid valve apparatus of the present invention, as described previously, the outer peripheral flow path is formed by the outer peripheral wall face of the cylindrical valve while the inner peripheral flow path is formed by the inner peripheral wall face of the cylindrical valve. Consequently, the quantity of fluid flowing through the fluid valve apparatus is increased. Therefore, the present invention is suitable for a fluid valve apparatus connected to an apparatus in which a large amount of fluid is demanded. As an apparatus in which a large amount of fluid is demanded, a fuel battery stack, particularly a vehicle-loaded fuel battery stack is exemplified.

What is claimed is:

1. A fluid valve apparatus comprising:
    a base body having a fluid intake through which fluid flows in, a fluid outlet through which fluid is discharged, and a valve accommodation chamber formed between said fluid intake and said fluid outlet;
    a cylindrical valve accommodated movably in said valve accommodation chamber in said base body; and
    a driving portion for moving said cylindrical valve in a direction for adjusting the opening degree of said cylindrical valve,
    said cylindrical valve including:
    an outer peripheral wall face which forms an outer peripheral flow path in said cylindrical valve so that fluid flows from said fluid intake to said fluid outlet;
    an inner peripheral wall face which forms an inner peripheral flow path in said cylindrical valve so that fluid flows from said fluid intake to said fluid outlet;
    a first valve section which forms a first valve flow path with a first valve receiving section of said base body so that fluid flows through one of said outer peripheral flow path and said inner peripheral flow path; and
    a second valve section which forms a second valve flow path with a second valve receiving section of said base body so that fluid flows through the other of said outer peripheral flow path and said inner peripheral flow path,
    wherein
    said cylindrical valve is moved by said driving portion so as to change flow path areas of said first valve flow path and said second valve flow path thereby changing the quantity of fluid flowing through the outer peripheral flow path and fluid flowing through the inner peripheral flow path of the cylindrical valve.

2. The fluid valve apparatus according to claim 1, wherein said cylindrical valve is disposed in the valve accommodation chamber of said base body such that a shaft end section in the axial direction thereof confronts fluid flowing from said fluid intake to said fluid outlet.

3. The fluid valve apparatus according to claim 1, wherein said driving portion comprises a driving motor mounted on said base body and a deceleration converting section for converting a rotary motion of said driving motor to a linear motion of said cylindrical valve.

4. The fluid valve apparatus according to claim 2, wherein said driving portion comprises a driving motor mounted on said base body and a deceleration converting section for converting a rotary motion of said driving motor to a linear motion of said cylindrical valve.

5. The fluid valve apparatus according to claim 3 wherein said deceleration converting section has a direct-acting shaft capable of moving in the axial direction of said cylindrical valve with a rotation of said driving motor, and wherein
    said cylindrical valve includes an outer cylindrical section having said outer peripheral wall face which forms said outer peripheral flow path and said inner peripheral wall face which forms said inner peripheral flow path, an inner cylindrical section having a shaft hole provided on the side of an inner periphery of said outer cylindrical section and arm sections for connecting said outer cylindrical sections to said inner cylindrical sections, wherein
    an initial position in the axial direction of said cylindrical valve with respect to said direct-acting shaft is capable of being adjusted by advancing or
    retracting a male thread section formed in the outer peripheral face of said direct-acting shaft with respect to a female thread section formed in the inner peripheral face of a shaft hole of said inner cylindrical section of said cylindrical valve, the both thread sections meshing with each other.

6. The fluid valve apparatus according to claim 1, further comprising an urging force generating section for generating an urging force for urging from one end section to the other end section in the axial direction of said cylindrical valve, wherein said urging force generating section generates an urging force for urging from the one end section to the other end section in the axial direction of said cylindrical valve by setting a pressure receiving area on the side of the one end section in the axial direction of said cylindrical valve larger than a pressure receiving area on the side of the other end section in the axial direction of said cylindrical valve.

7. The fluid valve apparatus according to claims 1, wherein a foreign matter invasion blocking section for keeping fluid flowing through at least one of said outer peripheral flow path and said inner peripheral flow path of said cylindrical valve apart from said driving portion is provided on at least one of said cylindrical valve and said base body so as to block invasion of foreign matter contained in fluid.

8. The fluid valve apparatus according to claims 1, the fluid valve apparatus is provided in the downstream or upstream of a fuel cell system.

9. The fluid valve apparatus according to claim 6, further comprising an urging force generating section for generating an urging force for urging from one end section to the other end section in the axial direction of said cylindrical valve wherein said urging force generating section generates an urging force for urging from the one end section to the other end section in the axial direction of said cylindrical valve by setting a pressure receiving area on the side of the one end section in the axial direction of said cylindrical valve larger than a pressure receiving area on the side of the other end section in the axial direction of said cylindrical valve.

* * * * *